US006657960B1

(12) United States Patent
Jeffries et al.

(10) Patent No.: US 6,657,960 B1
(45) Date of Patent: Dec. 2, 2003

(54) METHOD AND SYSTEM FOR PROVIDING DIFFERENTIATED SERVICES IN COMPUTER NETWORKS

(75) Inventors: Clark Debs Jeffries, Durham, NC (US); Brahmanand Kumar Gorti, Cary, NC (US); Michael Steven Siegel, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/448,197

(22) Filed: Nov. 23, 1999

(51) Int. Cl.[7] ............................................... H04L 12/28
(52) U.S. Cl. ..................... 370/230.1; 370/253; 370/413
(58) Field of Search ................................. 370/230–236, 370/252, 253, 412, 413, 414, 428–429, 465

(56) References Cited

U.S. PATENT DOCUMENTS

| 5,231,633 A | 7/1993 | Hluchyj et al. |
| 5,268,900 A | 12/1993 | Hluchyj et al. |

(List continued on next page.)

FOREIGN PATENT DOCUMENTS

| JP | 11-98155 | 4/1999 | |
| WO | 9826628 | 6/1998 | ............ H04Q/11/01 |

OTHER PUBLICATIONS

XP 000622960 "Analysis of Rate–Based Congestion Control Algorithms For ATM Networks. Part 2: Initial Transient State Analysis" Singapore, Nov. 14–16, 1995, New York, IEEE, US, Nov. 14,1995, PP. 1095–1101, ISBN:0–7803–2510–9abstract.
XP002161812 "BLUE: A New Class of Active Queue Management Algorithms" Apr. 30, 1999, pp. 1, 5, 9, 15, 25.
International Search Report–PCT–Mar. 19, 2001.
"Flow Control for Broadband Networks Control Operations," IBM Technical Disclosure Bulletin, vol. 41, No. 01, Jan. 1998.
"Time Clustered Access for Maximizing Bandwidth Utilization via Windows of Asynchronous Arrival," IBM Technical Disclosure Bulletin, vol. 37, No. 08, Aug. 1994.
http://www.cisco.com/univercd/cc/td/doc/product/software/ios120/12cgcr/qos_c/qcpart2/qcconman.htm—"Congestion Management Overview", Jun. 3, 1999, Cisco Systems Inc.

Primary Examiner—Douglas Olms
Assistant Examiner—Van Nguyen
(74) Attorney, Agent, or Firm—Sawyer Law Group

(57) ABSTRACT

A method and system for controlling a plurality of pipes in a computer network is disclosed. The computer network includes at least one processor for a switch. The at least one processor has a queue. The plurality of pipes utilizes the queue for transmitting traffic through the switch. The method and system include allowing a minimum flow and a maximum flow to be set for each of the plurality of pipes and determining if excess bandwidth exists for the queue. The method and system also include linearly increasing a flow for a pipe of the plurality of pipes based on the minimum flow or the maximum flow if excess bandwidth exists and if the flow for the pipe of the plurality of pipes is less than the maximum flow for the pipe. The method and system also include exponentially decreasing the flow for the pipe of the plurality of pipes based on the minimum flow or the maximum flow if excess bandwidth does not exist and the flow is greater than the minimum flow for the pipe. Thus, the traffic through the queue is stable.

46 Claims, 7 Drawing Sheets

U.S. PATENT DOCUMENTS

| | | | |
|---|---|---|---|
| 5,335,224 A | | 8/1994 | Cole et al. |
| 5,400,329 A | * | 3/1995 | Tokura et al. ............... 370/232 |
| 5,426,635 A | | 6/1995 | Mitra et al. |
| 5,463,620 A | | 10/1995 | Sriram |
| 5,706,288 A | | 1/1998 | Radhakrishnan et al. |
| 5,734,825 A | | 3/1998 | Lauck et al. |
| 5,748,629 A | | 5/1998 | Caldara et al. |
| 5,757,771 A | | 5/1998 | Li et al. |
| 5,787,086 A | | 7/1998 | McClure et al. |
| 5,796,719 A | | 8/1998 | Peris et al. |
| 5,864,538 A | | 1/1999 | Chong et al. |
| 5,914,936 A | * | 6/1999 | Hatono et al. ............... 370/230 |
| 5,917,822 A | | 6/1999 | Lyles et al. |
| 5,956,340 A | * | 9/1999 | Afek et al. .................. 370/412 |
| 5,978,357 A | * | 11/1999 | Charny ....................... 370/231 |
| 5,999,534 A | * | 12/1999 | Kim ........................ 370/395.42 |
| 6,122,251 A | * | 9/2000 | Shinohara ................... 370/231 |
| 6,141,323 A | * | 10/2000 | Rusu et al. .................. 370/236 |
| 6,175,554 B1 | * | 1/2001 | Jang et al. .................. 370/229 |
| 6,295,281 B1 | * | 9/2001 | Itkowsky et al. ........... 370/293 |
| 6,324,165 B1 | * | 11/2001 | Fan et al. .................... 370/232 |
| 6,424,624 B1 | * | 7/2002 | Galand et al. .............. 370/231 |
| 6,438,138 B1 | * | 8/2002 | Kamiya ....................... 370/468 |
| 6,480,911 B1 | * | 11/2002 | Lu ............................... 710/54 |

* cited by examiner

METHOD AND SYSTEM FOR PROVIDING DIFFERENTIATED SERVICES IN COMPUTER NETWORKS

CROSS-REFERENCE TO RELATED APPLICATIONS

The present invention is related to U.S. patent application Ser. No. 09/384,691, filed on Aug. 27, 1999, entitled "NETWORK PROCESSOR PROCESSING COMPLEX AND METHODS" and assigned to the assignee of the present application. The present invention is also related to U.S. patent application Ser. No. (09/448,380, filed on Nov. 23, 1999, entitled "METHOD AND SYSTEM FOR CONTROLLING TRANSMISSION OF PACKETS IN COMPUTER NETWORKS" and assigned to the assignee of the present application. The present invention is also related to U.S. patent application Ser. No. 09/448,190, filed on Nov. 23, 1999, entitled "METHOD AND SYSTEM FOR PROVIDING OPTIMAL DISCARD FRACTION" and assigned to the assignee of the present application.

FIELD OF THE INVENTION

The present invention relates to computer networks, and more particularly to a method and system for providing differentiated services in a stable manner for a computer network.

BACKGROUND OF THE INVENTION

Driven by increasing usage of a variety of network applications, such as those involving the Internet, computer networks are of increasing interest. In order to couple portions of a network together or to couple networks, switches are often used. For example, FIG. 1 depicts a high-level block diagram of a switch 10 which can be used in a computer network. The switch 10 includes a switch fabric 24 coupled with blades 7, 8 and 9. Each blade 7, 8 and 9 is generally a circuit board and includes at least a network processor 2 coupled with ports 4. Thus, the ports 4 are coupled with hosts (not shown). The blades 7, 8 and 9 can provide traffic to the switch fabric 24 and accept traffic from the switch fabric 24. Thus, any host connected with one of the blades 7, 8 or 9 can communicate with another host connected to another blade 7, 8 or 9 or connected to the same blade.

FIG. 2A depicts another simplified block diagram of the switch 10, illustrating some of the functions performed by network processors. The switch 10 couples hosts (not shown) connected with ports A 12 with those hosts (not shown) connected with ports B 36. The switch 10 performs various functions including classification of data packets provided to the switch 10, transmission of data packets across the switch 10 and reassembly of packets. These functions are provided by the classifier 18, the switch fabric 20 and the reassembler 30, respectively. The classifier 18 classifies packets which are provided to it and breaks each packet up into convenient-sized portions, which will be termed cells. The switch fabric 24 is a matrix of connections through which the cells are transmitted on their way through the switch 10. The reassembler 30 reassembles the cells into the appropriate packets. The packets can then be provided to the appropriate port of the ports B 36, and output to the destination hosts. The classifier 14 may be part of one network processor 1, while the reassembler 30 may be part of another network processor 5. The portions of the network processor 1 and the network processor 5 depicted perform functions for traffic traveling from ports A 12 and to ports B 36, respectively. However, the network processors 1 and 5 also perform functions for traffic traveling from ports B 36 and to ports A 12, respectively. Thus, each network processor 1 and 5 can perform classification and reassembly functions. Furthermore, each network processor 1 and 5 can be a network processor 2 shown in FIG. 1.

Referring back to FIG. 2A, due to bottlenecks in transferring traffic across the switch 10, data packets may be required to wait prior to execution of the classification, transmission and reassembly functions. As a result, queues 16, 22, 28 and 34 may be provided. Coupled to the queues 16, 22, 28 and 34 are enqueuing mechanisms 14, 20, 26 and 32. The enqueuing mechanisms 14, 20, 26 and 32 place the packets or cells into the corresponding queues 16, 22, 28 and 34 and can provide a notification which is sent back to the host from which the packet originated.

Although the queues 16, 22, 28 and 34 are depicted separately, one of ordinary skill in the art will readily realize that some or all of the queues 16, 22, 28 and 34 may be part of the same physical memory resource. FIG. 2B depicts one such switch 10'. Many of the components of the switch 10' are analogous to components of the switch 10. Such components are, therefore, labeled similarly. For example, the ports A 12' in the switch 10' correspond to the ports A 12 in the switch 10. In the switch 10', the queue A 14 and the queue B 22 share a single memory resource 19. Similarly, the queue C 28 and the queue D 34 are part of another single memory resource 31. Thus, in the switch 10', the queues 16, 22, 28 and 34 are logical queues partitioned from the memory resources 19 and 31. Currently, most conventional switches 10 treat flows of traffic across the network in which the switch is used the same. There is, however, a trend toward providing customers with different services based, for example, on the price paid by a consumer for service. A consumer may wish to pay more to ensure a faster response or to ensure that the traffic for the customer will be transmitted even when traffic for other customers is dropped due to congestion. Thus, the concept of differentiated services has been developed. Differentiated services can provide different levels of service, or flows of traffic through the network, for different customers.

DiffServ is an emerging Internet Engineering Task Force (IETF) standard for providing differentiated services (see IETF RFC 2475 and related RFCs). DiffServ is based on behavior aggregate flows. A behavior aggregate flow can be viewed as a pipeline from one edge of the network to another edge of the network. Within each behavior aggregate flow, there could be hundreds of sessions between individual hosts. However, DiffServ is unconcerned with session within a behavior aggregate flow. Instead, Diffserv is concerned with allocation of bandwidth between the behavior aggregate flows. According to DiffServ, excess bandwidth is to be allocated fairly between behavior aggregate flows. Furthermore, DiffServ provides criteria, discussed below, for measuring the level of service provided to each behavior aggregate flow.

One conventional mechanism for providing different levels of services utilizes a combination of weights and a queue level to provide different levels of services. FIG. 3 depicts such a conventional method 50. The queue level thresholds and weights are set, via step 52. Typically, the queue level thresholds are set in step 52 by a network administrator turning knobs. The weights can be set for different pipes, or flows, through a particular queue, switch 10 or network processor 1 or 5. Thus, the weights are typically set for different behavior aggregate flows. The queue levels are observed, typically at the end of a period of time known as an epoch, via step 54. The flows for the pipes are then changed based on how the queue level compares to the queue level threshold and on the weights, via step 56. Flows for pipes having a higher weight undergo a greater change in step 56. The flow for a pipe determines what fraction of traffic offered to a queue, such as the queue 15, by the pipe will be transmitted to the queue 16 by the corresponding enqueuing mechanism, such as the enqueuing mechanism 14. Traffic is thus transmitted to the queue or dropped based on the flows, via step 58. A network administrator then determines whether the desired levels of service are being met, via step 60. If so, the network administrator has completed his or her task. However, if the desired level of service is not achieved, then the queue level thresholds and, possibly, the weights are reset, via step 52 and the method 50 repeats.

Although the method 50 functions, one of ordinary skill in the art will readily realize that it is difficult to determine what effect changing the queue level thresholds will have on particular pipes through the network. Thus, the network administrator using the method 50 may have to engage in a great deal of experimentation before reaching the desired flow rate for different customers, or pipes (behavior aggregate flows) in a computer.

Furthermore, the method 50 indirectly operates on parameters that are typically use to measure the quality of service. Queue levels are not a direct measure of criteria typically used for service. Typically, for example in DiffServ (see IETF RFC 2475 and related RFCs), levels of service are measured by four parameters: drop rate, bandwidth, latency and jitter. The drop rate is the percentage of traffic that is dropped as it flows across a switch. The bandwidth of a behavior aggregate flow is a measure of the amount of traffic for the behavior aggregate flow which crosses the switch and reaches its destination. Latency is the delay incurred in sending traffic across the network. Jitter is the variation of latency with time. The queue levels are not considered to be a direct measure of quality of service. Thus, the method 50 does not directly address any of the criteria for quality of service. Thus, it is more difficult for a network administrator to utilize the method 50 for providing different levels of service.

Another conventional method for controlling traffic utilizes flows, minimum flows rates, weights, priorities, thresholds and a signal indicating that excess bandwidth, or ability to transmit traffic, exists in order to control flows. However, it is not clear that this conventional method is a stable mechanism for controlling traffic through the switch. Consequently, this conventional method may not adequately control traffic through the switch 10.

Accordingly, what is needed is a system and method for better providing differentiated services. The present invention addresses such a need.

SUMMARY OF THE INVENTION

The present invention provides a method and system for controlling a plurality of pipes in a computer network. The computer network includes at least one processor for a switch. The at least one processor has a queue. The plurality of pipes utilizes the queue for transmitting traffic through the switch. The method and system comprise allowing a minimum flow and a maximum flow to be set for each of the plurality of pipes and determining if excess bandwidth exists for the queue. The method and system also comprise linearly increasing a flow for a pipe of the plurality of pipes based on the minimum flow or the maximum flow if excess bandwidth exists and if the flow for the pipe of the plurality of pipes is less than the maximum flow for the pipe. The method and system also comprise exponentially decreasing the flow for the pipe of the plurality of pipes based on the minimum flow or the maximum flow if excess bandwidth does not exist and the flow is greater than the minimum flow for the pipe. Thus, the traffic through the queue is stable According to the system and method disclosed herein, the present invention provides a stable mechanism for fairly allocating bandwidth in a system that provides differentiated services.

DETAILED DESCRIPTION OF THE INVENTION

Figure 1:
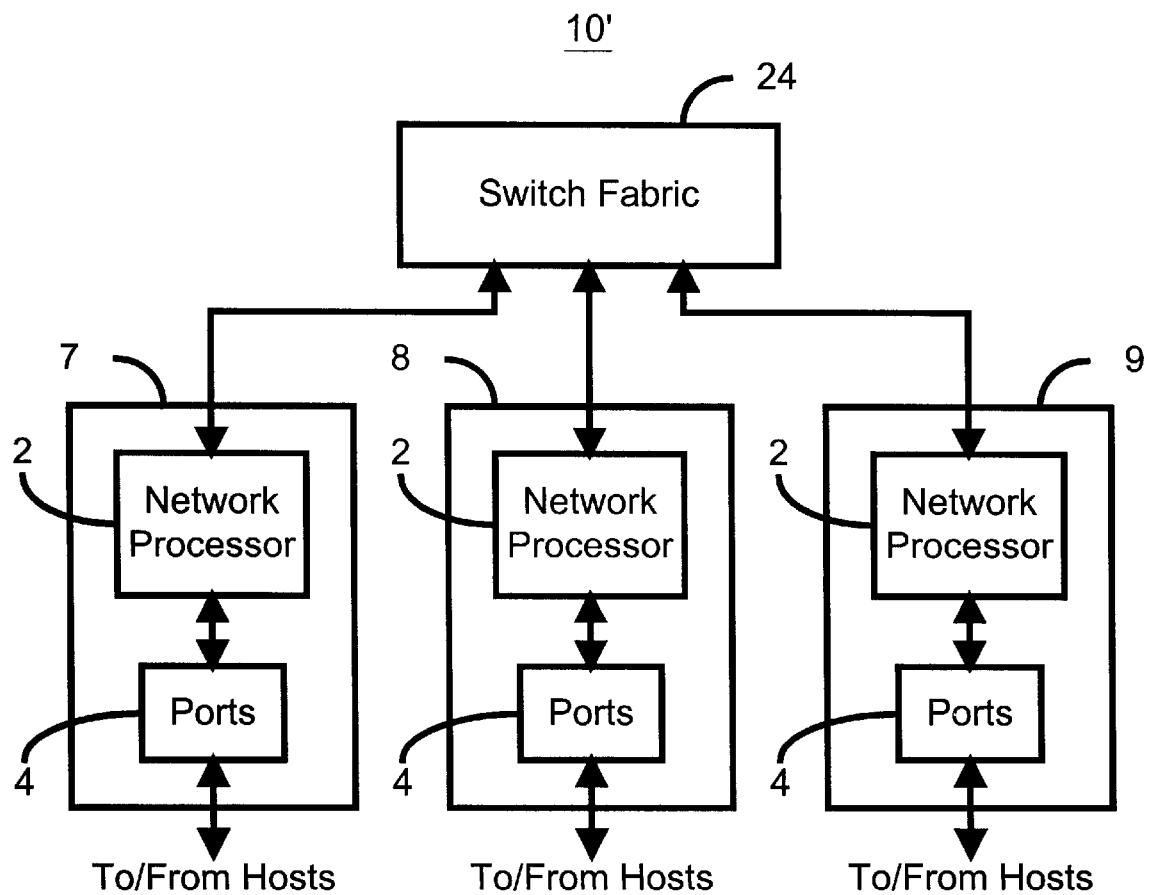
FIG. 1 is a high-level block diagram of a switch.

The present invention relates to an improvement in control of traffic in computer networks. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

Currently, it is desired to provide different levels of service in a network. One conventional method currently available utilizes queue level thresholds in order to provide different levels of services through the switch. However, one of ordinary skill in the art will readily recognize that this conventional method only indirectly controls traffic through the switch. As a result, the method is more difficult to use. Another conventional method for controlling traffic utilizes flows, minimum flows rates, weights, priorities, thresholds and a signal indicating that excess bandwidth exists to provide different flows to a queue. However, it is not clear that this conventional method is a stable mechanism for controlling traffic through the switch. Consequently, this conventional method may not adequately control traffic through the switch.

The present invention provides a method and system for controlling a plurality of pipes in a computer network. The computer network includes at least one processor for a switch. The at least one processor has a queue. The plurality of pipes utilizes the queue for transmitting traffic through the switch. The method and system comprise allowing a minimum flow and a maximum flow to be set for each of the plurality of pipes and determining if excess bandwidth exists for the queue. The method and system also comprise linearly increasing a flow for a pipe of the plurality of pipes based on the minimum flow or the maximum flow if excess bandwidth exists and if the flow for the pipe of the plurality of pipes is less than the maximum flow for the pipe. The method and system also comprise exponentially decreasing the flow for the pipe of the plurality of pipes based on the minimum flow or the maximum flow if excess bandwidth does not exist and the flow is greater than the minimum flow for the pipe. Thus the traffic through the queue is stable.

The present invention will be described in terms of a particular system and particular components. However, one of ordinary skill in the art will readily recognize that this method and system will operate effectively for other components in a computer network. The present invention will also be described in the context of a queue. However, one of ordinary skill in the art will readily recognize that the present invention functions effectively when queues are logical queues part of a single memory resource or when the queues are part of separate memory resources. Furthermore, the present invention functions analogously when controlling flows into a subqueue of a particular logical queue. The present invention will also be discussed in terms of controlling network flows by proactively discarding packets. However, one of ordinary skill in the art will readily realize that the method and system control the rate of packets arriving in a queue and that a signal sent to a source and dictating a fraction of packets to be sent, with others held at the source, would be effective. Therefore, control of a transmission fraction is analogous control of a rate at which packets are offered, for example by one or more sources. Furthermore, the present invention will be described in terms of pipes, or flows provided, to a queue. However, one of ordinary skill in the art will readily realize that the pipes could be behavior aggregate flows of different or the same class or any offered rate into a particular component which utilizes a queue for storage.

Figure 4:
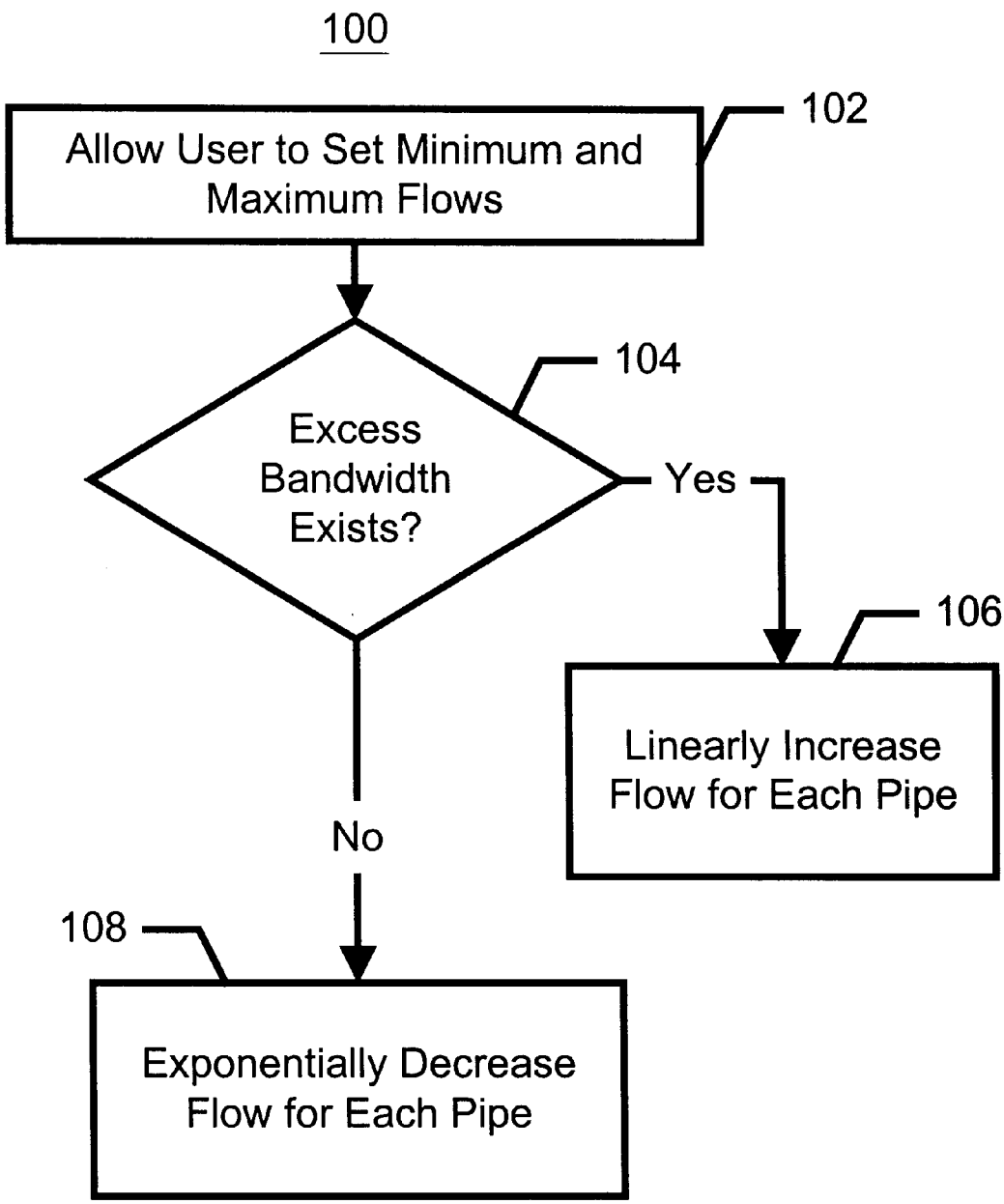
FIG. 4 is a flow chart depicting a method in accordance with the present invention for providing different levels of service through a switch.

To more particularly illustrate the method and system in accordance with the present invention, refer now to FIG. 4, depicting one embodiment of a method 100 in accordance with the present invention. The method 100 is preferably accomplished using the apparatus disclosed in U.S. patent application Ser. No. 09/384,691, filed on Aug. 27, 1999, entitled "NETWORK PROCESSING COMPLEX AND METHODS" and assigned to the assignee of the present application. Applicants hereby incorporate by reference the above-mentioned co-pending U.S. Patent Application. The method 100 can be used with the switch 10 or 10' shown in FIGS. 1, 2A and 2B. Thus, the method 100 can be carried out in a switch 10 having multiple blades 7, 8 and 9 and multiple ports on each blade 7, 8 or 9. For the purposes of clarity, the method 100 will be explained in conjunction with the queue 16 and enqueuing mechanism 14 depicted in FIG. 2A. However, the method 100 can be used with other queues, such as the queues 22, 28, 34, 16', 22', 28' and 34'. The method 100 can also be used with other enqueuing mechanisms, such as the enqueuing mechanisms 20, 26, 32, 14', 20', 26' and 32'. In a preferred embodiment, the method 100 is used in a system in which multiple queues are part of the same memory resource. However, nothing prevents the method 100 from being used in another system in which each queue has a separate memory resource.

Figure 2A:
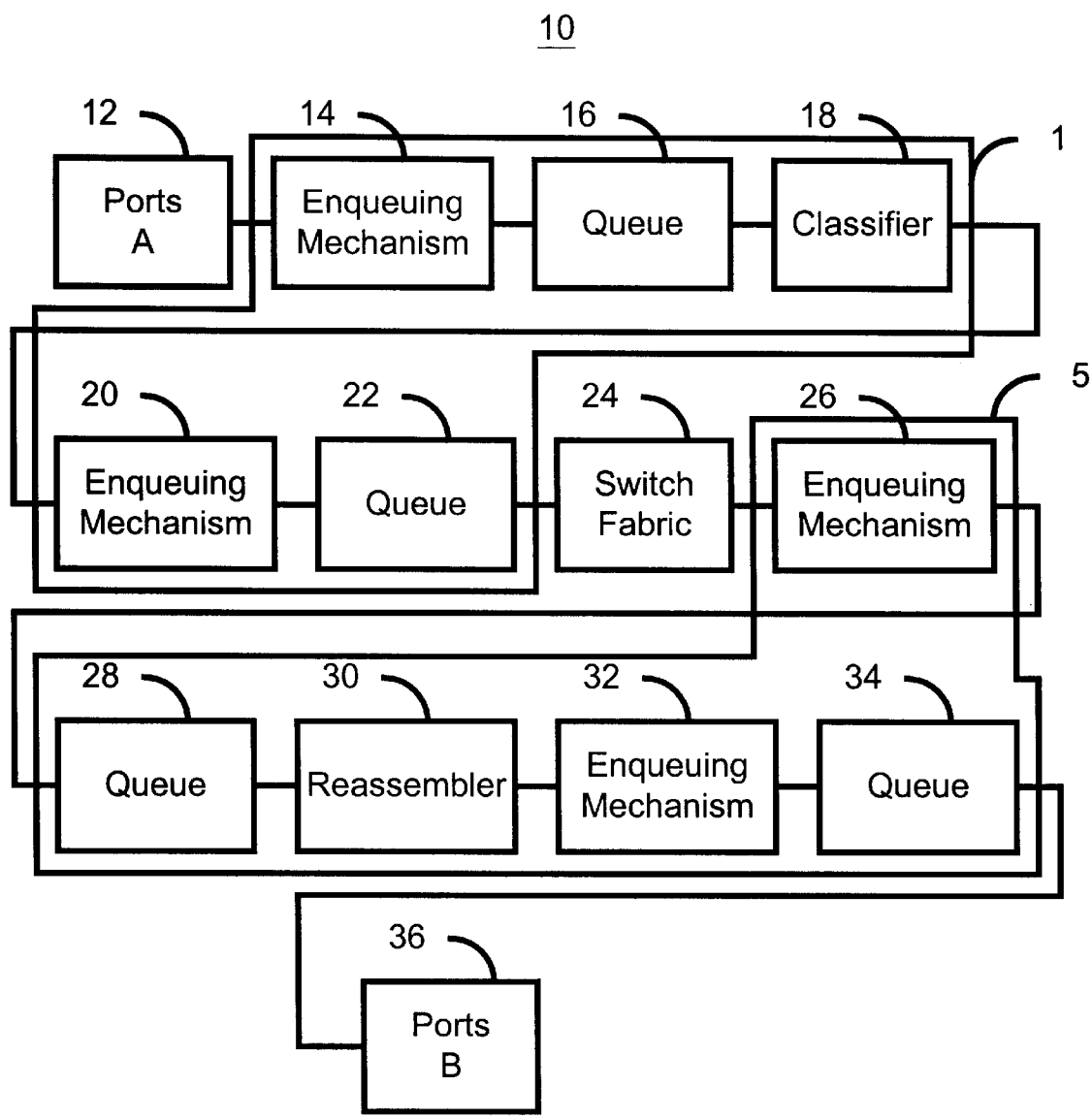
FIG. 2A is a simplified block diagram of a switch.

Referring to FIGS. 2A and 4, the minimum and maximum flows for pipes providing traffic to the queue 16 are set, via step 102. The pipes may come from any of the ports A 12 to the enqueuing mechanism 14. In a preferred embodiment, the pipes of interest are behavior aggregate flows. Thus, step 102 preferably sets the minimum and maximum bandwidth for behavior aggregate flows of interest. Furthermore, the sum of the minimum flows for the pipes should be less than or equal to the service rate, S, of the shared queue processor. This is because flows are defined as a fraction of the total amount of traffic which the queue 16 can service. The minimum flow for a pipe can be zero. Typically, the queue 16 has a defined service rate, the rate at which the queue 16 can output items from the queue. In a preferred embodiment, the sum of the minimum flow rates is less than one-half of the service rate, S. Also in a preferred embodiment, the maximum flow for each pipe is less than or equal to the service rate. Although in a preferred embodiment the maximum number of pipes serviced by the queue 16 is less than or equal to 1024, there is no real upper limit on the number of pipes controlled. In addition, each pipe offers traffic to the queue 16 at an offered rate, $I_i(t)$, where i denotes the $i^{th}$ pipe. Depending on different factors, some of the traffic may be dropped. The transmission fraction for the $i^{th}$ pipe, $T_i(t)$, is the fraction of traffic from the $i^{th}$ pipe which is transmitted to the queue 16. Thus, the instantaneous flow for the $i^{th}$ pipe is $f_i(t)=I_i(t)*T_i(t)$. In a preferred embodiment, the method 100 can also ensure that the pipes having traffic flowing through them have at least their minimum flows.

It is determined whether the queue 16 has excess bandwidth available, via step 104. In a preferred embodiment, excess bandwidth is determined not to exist if the queue level is increasing. Also in a preferred embodiment, excess bandwidth is determined to exist in step 104 if the queue 16 is empty or if the queue level for the queue 16 is decreasing. Thus, step 104 preferably includes determining a queue level and comparing the queue level to a previous queue level. Also in a preferred embodiment, excess bandwidth is determined not to exist if the queue level is not either zero or decreasing. However, nothing prevents the use of another criteria for determining whether excess bandwidth exists.

If it is determined in step 104 that excess bandwidth exists, then the flows for the pipes are increased linearly, via step 106. Preferably, step 106 is accomplished by linearly increasing the transmission fraction for each of the pipes. The linear increase for a pipe can be based on the minimum flow, the maximum flow, or a weight. Thus, the linear increase for a pipe can be based on the pipe's minimum flow only, the maximum flow only, some combination of a minimum flow and the weight, some combination of the maximum flow and the weight, or some combination of the minimum and maximum flows and the weight. However, in a preferred embodiment, the linear increase for the pipe is based on the minimum flow for the pipe.

If it is determined in step 104 that excess bandwidth does not exist, then flows for the pipes are decreased exponentially, via step 108. Preferably, step 108 is accomplished by exponentially decreasing the transmission fraction for each pipe. The exponential decrease for a pipe can be based on the minimum flow or the maximum flow. Thus, the exponential decrease for a pipe can be based on the pipe's minimum flow only, the maximum flow only, or some combination of the minimum and maximum flows. However, in a preferred embodiment, the exponential decrease for the pipe is based on the minimum flow for the pipe. Because the decrease is exponential in nature, the decrease is also based on the current flow, or transmission fraction, for the pipe.

Because the method 100 increases flows linearly and decreases flows exponentially, the method 100 generally ensure that the traffic through pipes to the queue 16 can automatically and asymptotically reach stability. Flows will increase or decrease depending upon whether the queue 16 has excess bandwidth. When stability is reached, flows will linearly increase as long as excess bandwidth exists, then will exponentially decrease, due to the lack of excess bandwidth, until excess bandwidth again becomes available. This behavior will repeat. In other words, the traffic from the pipes can settle into a steady cyclic state known as a limit cycle. Thus, regardless of the state in which the traffic through the pipes commences, the system will move toward stable cyclic behavior. This stable behavior may not be achieved with another combination of increases and decreases. For example, an exponential increase and a linear decrease or an exponential increase and an exponential decrease may not produce stable behavior. Furthermore, the increase and decrease in the flow for each pipe will depend upon the minimum or maximum flow for the pipe and the previous flow for the pipe. Thus, different pipes may have different levels of flow, or service. Consequently, the method 100 can not only allocate produce stable behavior, but can also provide differentiated services and allocate excess bandwidth for the queue 16 fairly. All a network administrator or other user must do is set the minimum and maximum flows for customers differently depending upon the level of service desired for the particular customer. Thus, the method 100 can be used in a variety of applications, such as in networks using DiffServ, by internet service providers desiring to provide different levels of service to different customers or for different media. This is accomplished merely by allowing the minimum and maximum flow to be set for the behavior aggregate flows, the customers, the media, classes or other flows corresponding to the pipes in the method 100.

Figure 5:
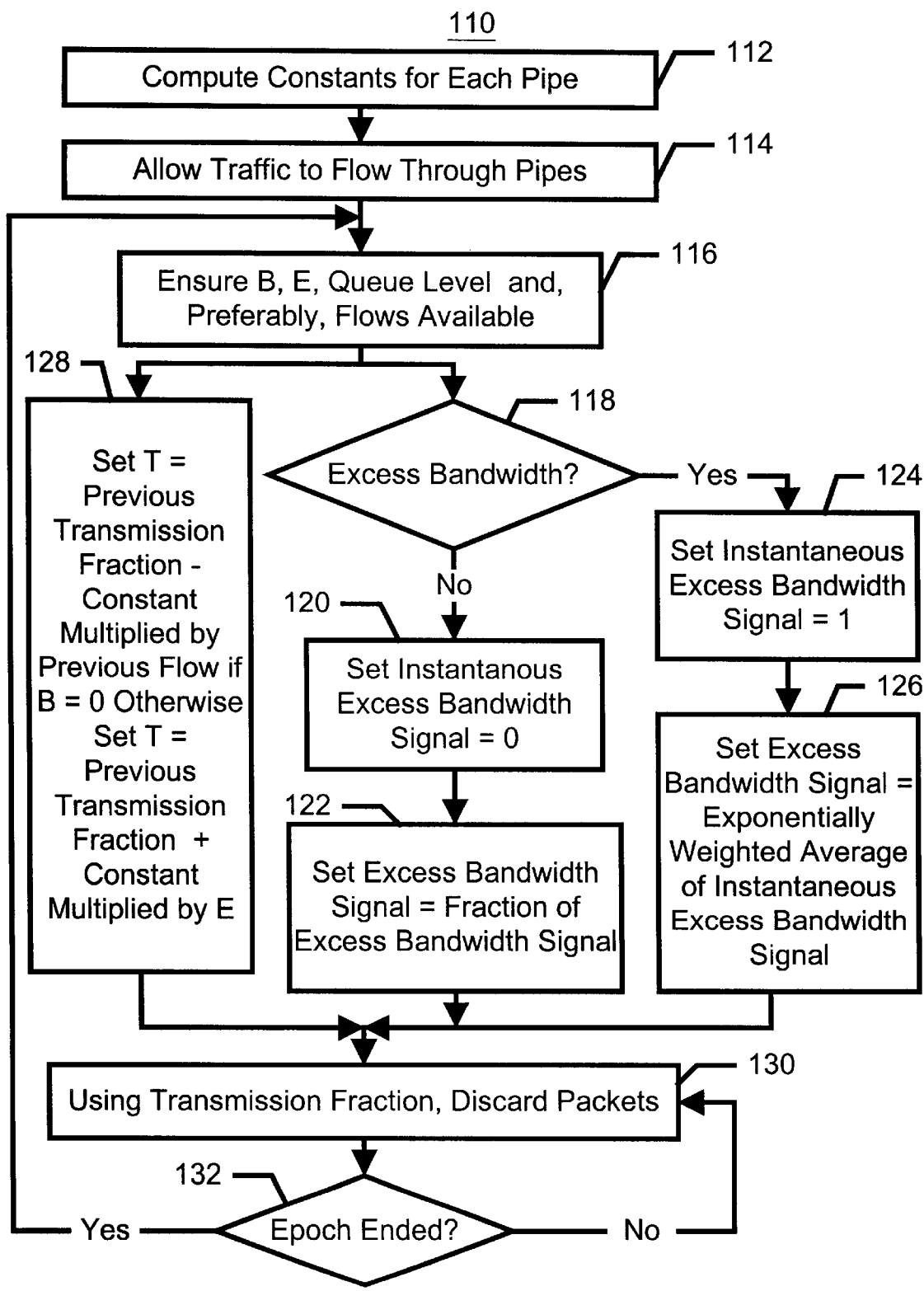
FIG. 5 is a more detailed flow chart depicting a method in accordance with the present invention for providing different levels of service through a switch.

FIG. 5 depicts a more detailed flow chart of a method 110 in accordance with the present invention for providing differentiated services. Again, the method 110 is preferably accomplished using the apparatus disclosed in U.S. patent application Ser. No. 09/384,691, filed on Aug. 27, 1999 entitled "NETWORK PROCESSING COMPLEX AND METHODS". The method 110 can be used with the switch 10 or 10' shown in FIGS. 1, 2A and 2B. Thus, the method 110 can be carried out in a switch 10 having multiple blades 7, 8 and 9 and multiple ports on each blade 7, 8 or 9. For the purposes of clarity, the method 110 will be explained in conjunction with the queue 16 and enqueuing mechanism 14 depicted in FIG. 2A. However, the method 110 can be used with other queues, such as the queues 22, 28, 34, 16', 22', 28' and 34'. The method 110 can also be used with other enqueuing mechanisms, such as the enqueuing mechanisms 20, 26, 32, 14', 20', 26' and 32'. In a preferred embodiment, the method 110 is used in a system in which multiple queues are part of the same memory resource. However, nothing prevents the method 110 from being used in another system in which each queue has a separate memory resource. Furthermore, the method 110 will be described in the context of pipes, however, the method 110 can be used for a variety of components, including behavior aggregate flows, which correspond to pipes.

The method 110 commences after the minimum and maximum flows for each of the pipes being controlled have been set, for example by a network administrator. Constants are computed for each of the pipes based on the minimum and maximum flows for the pipe, via step 112. For each pipe, i, a constant $C_i$ and a constant $D_i$ are computer in step 112. The constant $C_i$ is used for linearly increasing the flow for pipe i, as discussed below. Similarly, the constant $D_i$ is used for exponentially decreasing the flow for the pipe i, as discussed below. In a preferred embodiment, the constants $C_i$ and $D_i$ are both based on the minimum flows. In an alternate embodiment, weights for different pipes can also be provided. In such a case, the constant $C_i$ and $D_i$ may also be calculated based on the weights provided.

Once the constants are determined, traffic is allowed to flow through the pipes to the queue 16, via step 114. Te queue level, instantaneous excess bandwidth signal, B, and the excess bandwidth signal, E, are determined for the prior epoch if not already available, via step 116. In a preferred embodiment, the flows for the prior epoch are also made available in step 116. In other words, step 116 determines the quantities necessary to update the system in the method 110. It is then determined whether excess bandwidth exists, via step 118. In a preferred embodiment, excess bandwidth is determined to exist only if the queue level for the queue 16 is zero or is decreasing. Otherwise it will be determined that excess bandwidth does not exist. However, nothing prevents the use of another criteria for determining whether excess bandwidth exists. In a preferred embodiment, the queue level determined is the level for the entire memory resource. However, nothing prevents the queue level being determined for a logical queue or subqueue. If excess bandwidth does not exist, then an instantaneous excess bandwidth signal, B, is set to zero, via step 120. The signal B is termed instantaneous because it is based upon a single measurement of the queue level and a single determination of the change in the queue level. An excess bandwidth signal, E, is then set to be a constant multiplied by a previous excess bandwidth signal, via step 122. Preferably, the constant is $31/32$ and should generally be less than one. In a preferred embodiment, the excess bandwidth signal is an exponentially weighted average of the instantaneous excess bandwidth signal. The value of the excess bandwidth signal is appropriately set in step 122 because the instantaneous excess bandwidth signal is zero.

If it is determined in step 118 that excess bandwidth does exist, then the instantaneous excess bandwidth signal is set to one, via step 124. The excess bandwidth signal is then set to an exponentially weighted average of the instantaneous excess bandwidth signal, via step 126. Thus, in a preferred embodiment, the excess bandwidth signal is a first constant multiplied by a previous excess bandwidth signal plus a second constant multiplied by the instantaneous excess bandwidth signal. The first and second constant may both be less than one and are preferably $31/32$ and $1/32$, respectively.

In a preferred embodiment, the transmission fraction for each pipe i is set, via step 128, in parallel with the steps 118 through 126. However, in an alternate embodiment, the transmission fraction can be updated serially with the instantaneous excess bandwidth signal and the excess bandwidth signal. If the previous instantaneous excess bandwidth signal, B, was one (excess bandwidth available), then step 128 would set the transmission fraction for each pipe i based on the previous transmission fraction, the constant $C_i$, and the excess bandwidth signal. Preferably, the transmission fraction set in step 128 for excess bandwidth previously existing is:

$$T_i(t+Dt)=T_i(t)+C_i{}^*E(t)$$

Where:
  Dt=Length of an epoch (time since transmission fraction last calculated) Preferably, the flow units are set so that Dt and the maximum possible queue level, $Q_{max}$, are one. Thus, the transmission fraction linearly decreases. Furthermore, the transmission fraction will continue to linearly increase as long as excess bandwidth continues to exist. If excess bandwidth did not exists in the previous epoch (B was zero), then in step 128 the transmission fraction, $T_i(t+Dt)$ for each pipe i is then set based on a previous transmission fraction for the pipe, $T_i(t)$, $D_i$, and the previous flow for the pipe, $f_i(t)$. The transmission fraction when excess bandwidth did not previously exist is preferably given by:

$$T_i(t+Dt)=T_i(t)-D_i*f_i(t)$$

Thus, the transmission fraction set in step 128 ensures that the transmission fraction and, therefore, the flow will exponentially decrease as long as excess bandwidth continues not to exist. The constants $C_i$ and $D_i$ are preferably based on minimum flow values. The exact preferred values for the constants $C_i$ and $D_i$ are discussed below, with respect to FIG. 6.

Referring back to FIG. 5, using the transmission fraction calculated in step 128, packets passing through the switch 10 are transferred or dropped during the epoch, via step 130. In a preferred embodiment, packets are dropped based not only on the transmission fraction for the pipe in which they are flowing, but also on the priority of each packet. In another embodiment, the packets are dropped randomly. It is determined whether the epoch is completed, via step 132. If not, then traffic continues to be transferred based on the same transmission fractions, via step 130. If the epoch has finished, then the method repeats commencing with step 116.

Because the method 110 increases flows linearly and decreases flows exponentially, the method 110 functions similarly to the method 100 and provides many of the same benefits. Thus, the method 110 can ensure that the traffic through pipes to the queue 16 can automatically and asymptotically reach stability. The traffic from the pipes can settle into a steady cyclic state known as a limit cycle. Thus, regardless of the state in which the traffic through the pipes commences, the system will move toward stable cyclic behavior. Furthermore, the increase and decrease in the flow for each pipe will depend upon the minimum flow for the pipe and the previous flow for the pipe. Thus, different pipes may have different levels of flow, or service. Consequently, the method 110 can allocate produce stable behavior, allocate excess bandwidth for the queue 16 fairly and provide differentiated services. All a network administrator or other user must do is set the minimum and maximum flows for customers differently depending upon the level of service desired for the particular customer. Thus, the method 110 can be used in a variety of applications, such as in networks using DiffServ, by internet service providers desiring to provide different levels of service to different customers or for different media. This is accomplished merely by allowing the minimum and maximum flow to be set for the behavior aggregate flows, customers, classes, media, or other flows corresponding to the pipes in the method 110.

Furthermore, if the decrease in the flow rate from the transmission fractions is fast enough, the area under the curves describing flows for pipes is proportional to the slope of the linear increase in the flow. The area under the curve for a flow indicates the bits per second flowing through a pipe into the queue 16. The flow through a pipe can also be calculated over an epoch, indicating the exact flow through a pipe. Thus, the flow, or bandwidth as defined in DiffServ, is regulated.

Figure 6:
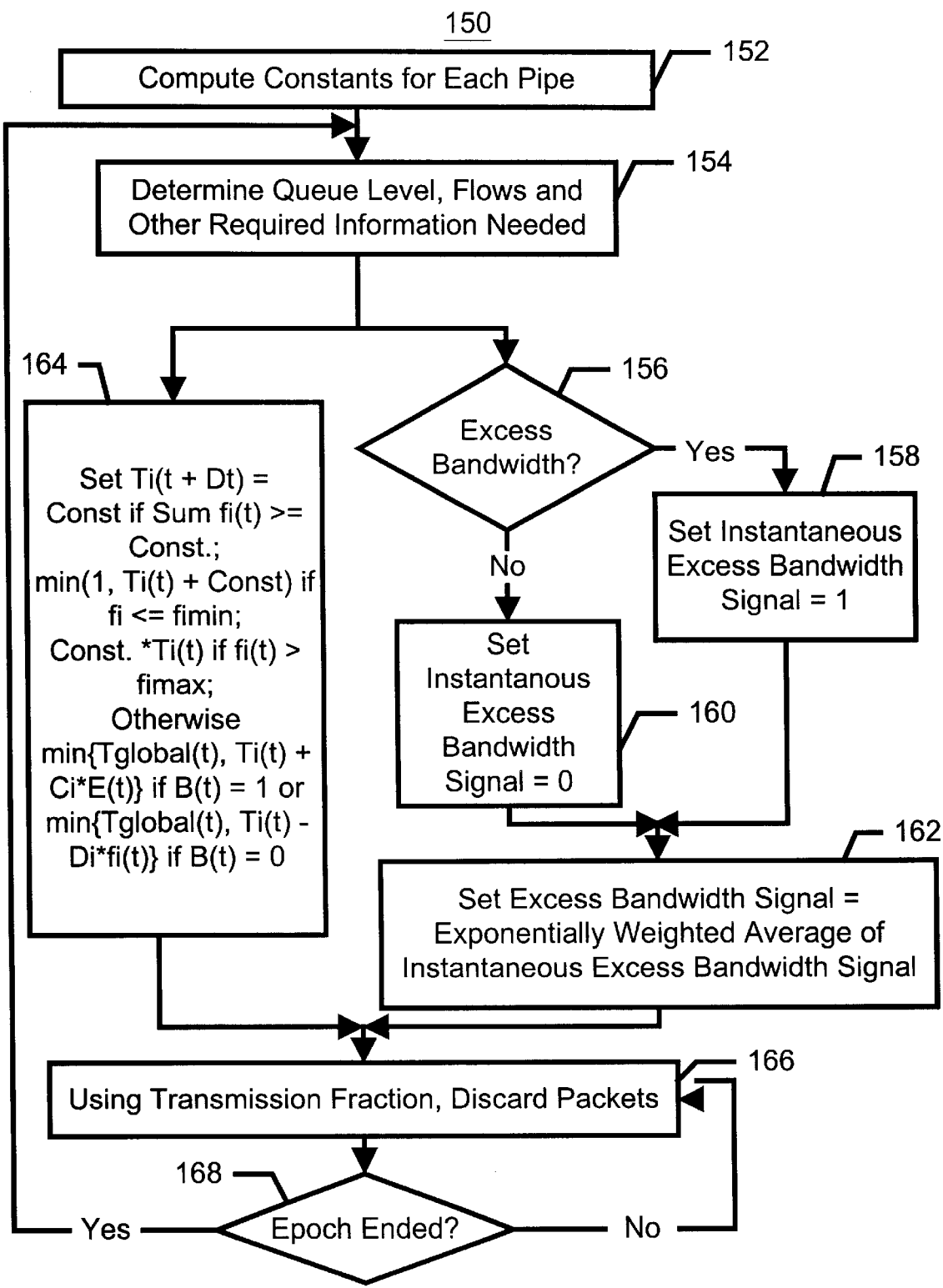
FIG. 6 is a detailed flow chart depicting a preferred embodiment of a method in accordance with the present invention for providing different levels of service through a switch.

FIG. 6 depicts a more detailed flow chart of a preferred embodiment of a method 150 for providing differentiated services. Again, the method 150 is preferably accomplished using the apparatus disclosed in U.S. patent application Ser. No. 09/384,691, filed on Aug. 27, 1999, entitled "NETWORK PROCESSING COMPLEX AND METHODS". The method 150 also preferably incorporates the inventions disclosed in U.S. patent application Ser. No. 09/448,380, filed on Nov. 23, 1999, entitled "METHOD AND SYSTEM FOR CONTROLLING TRANSMISSION OF PACKETS IN COMPUTER NETWORKS" and assigned to the assignee of the present application and in U.S. patent application Ser. No. 09/448,190, filed on Nov. 23, 1999, entitled "METHOD AND SYSTEM FOR PROVIDING OPTIMAL DISCARD FRACTION" and assigned to the assignee of the present application. Applicants hereby incorporate the above mentioned co-pending patent applications. In general, the method 150 utilizes the inventions disclosed in two of the above-mentioned co-pending patent applications to control the transmission fractions at a high level when necessary and otherwise uses a method similar to the methods 100 and 110.

Figure 2B:
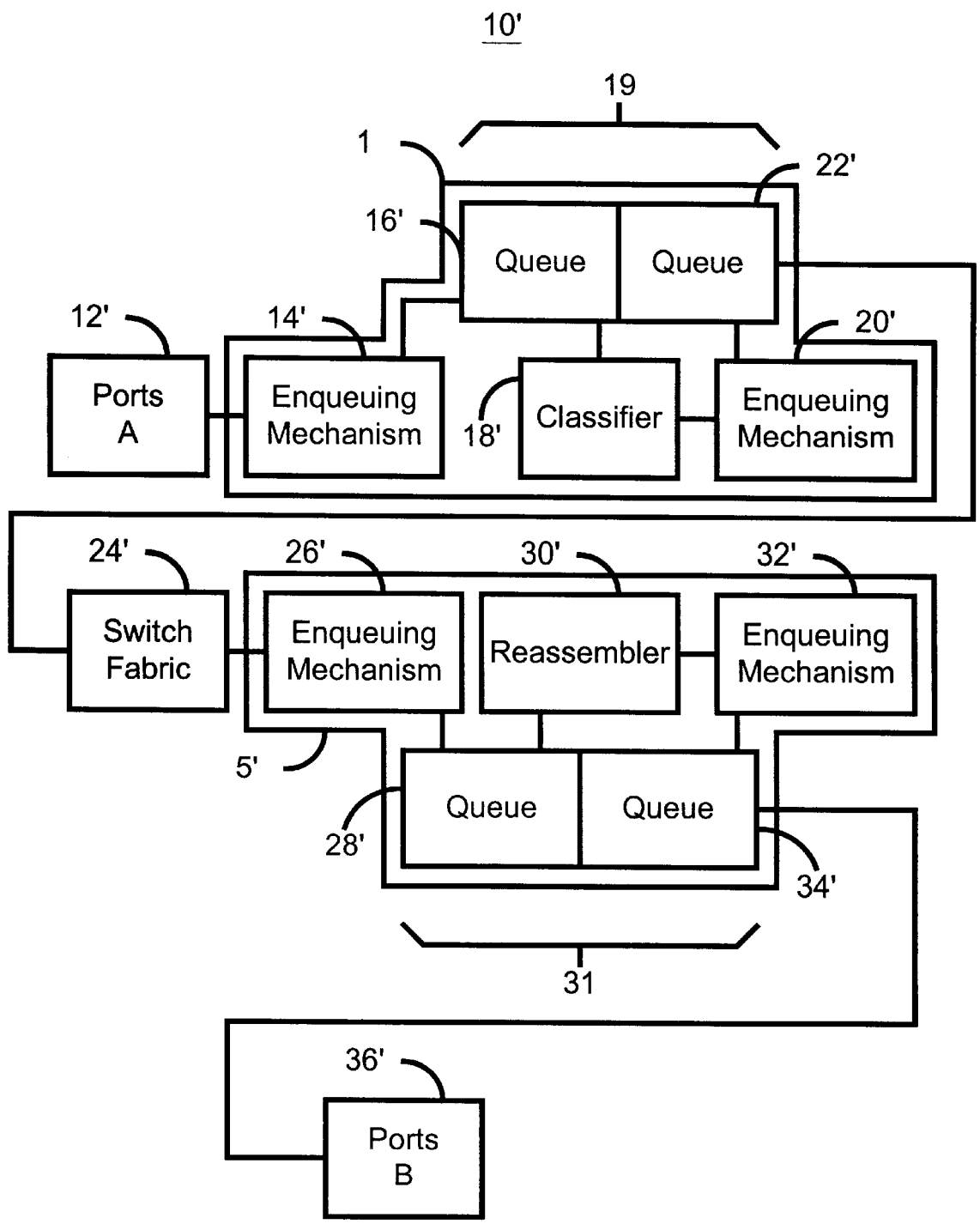
FIG. 2B is a simplified block diagram of another switch.
Figure 3:
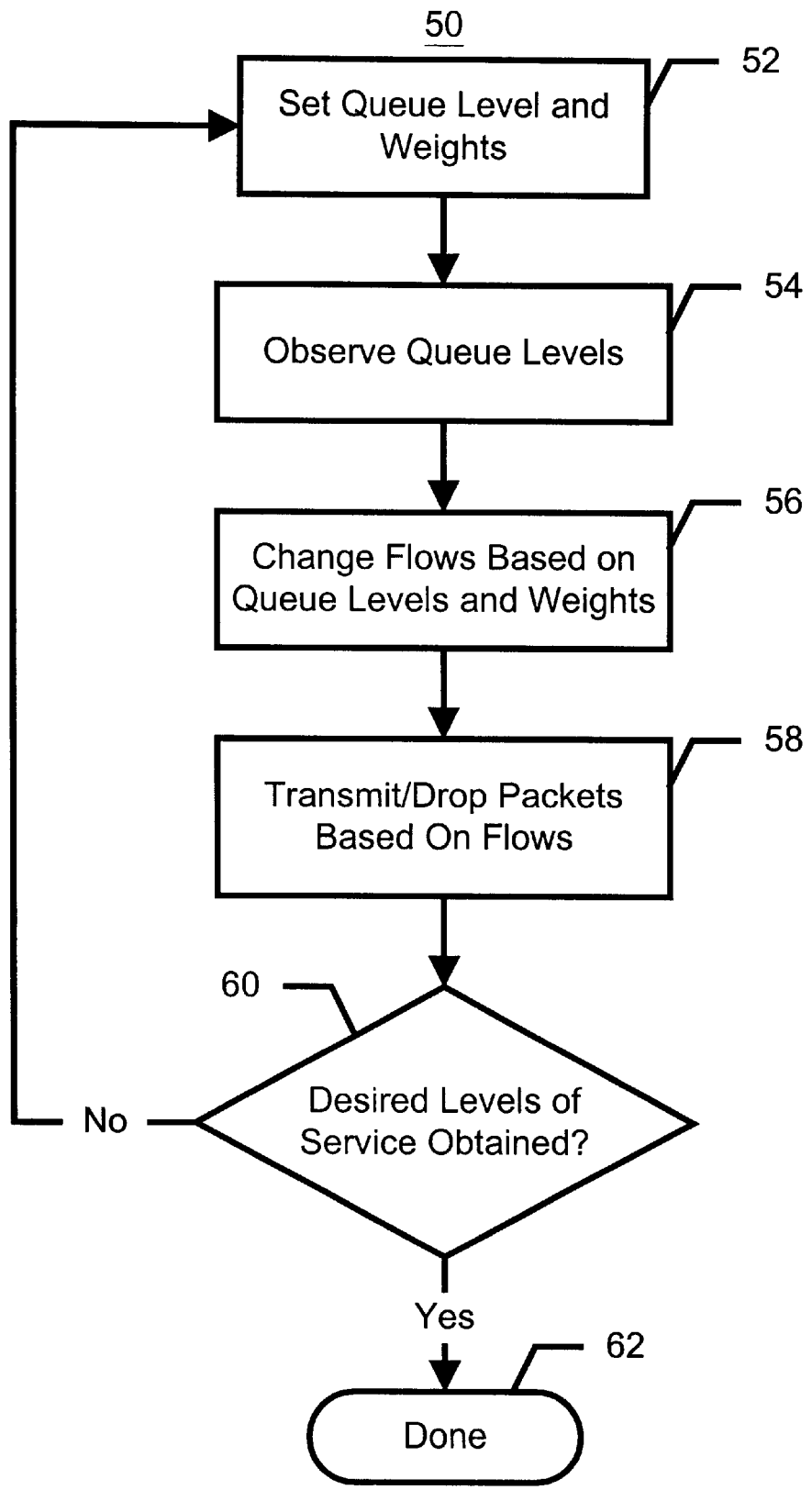
FIG. 3 is a flow chart depicting a conventional method for providing different levels of service through a switch.

The method 150 can be used with the switch 10 or 10' shown in FIGS. 1, 2A and 2B. Thus, the method 150 can be carried out in a switch 10 having multiple blades 7, 8 and 9 and multiple ports on each blade 7, 8 or 9. For the purposes of clarity, the method 150 will be explained in conjunction with the queue 16 and enqueuing mechanism 14 depicted in FIG. 2A. However, the method 150 can be used with other queues, such as the queues 22, 28, 34, 16', 22', 28' and 34'. The method 150 can also be used with other enqueuing mechanisms, such as the enqueuing mechanisms 20, 26, 32, 14', 20', 26' and 32'. In a preferred embodiment, the method 150 is used in a system in which multiple queues are part of the same memory resource. However, nothing prevents the method 150 from being used in another system in which each queue has a separate memory resource. Furthermore, the method 150 will be described in the context of pipes, however, the method 150 can be used for a variety of components, including behavior aggregate flows, which correspond to pipes.

The method 150 preferably commences after the minimum and maximum flows and, where used, weights, for each of the pipes has been set. As discussed previously, the sum of the minimum flows should be less than one and is preferably less than half of the service rate for the queue 16. Also in a preferred embodiment, each of the minimum and maximum flows is less than they service rate. In a preferred embodiment, the number of flows is less than or equal to sixty-four. In a preferred embodiment, the weight for each pipe is one and, therefore, does not affect behavior of the switch 10. As discussed above, the offered rate to a queue by a pipe, $I_i(t)$, is multiplied by the transmission fraction for the pipe, $T_i(t)$, in order to obtain the flow for the pipe, $f_i(t)$.

Constants for increasing or decreasing the flows for the pipes are determined based on the minimum flows and, where used, the weights, via step 152. Preferably, the constant for increasing the flow, $C_i$, and the constant for decreasing the flow, $D_i$, of a pipe are calculated as follows:

$$C_i = N*(W_i/W)*\left(S+f_{imin}-\sum_j f_{jmin}\right)\bigg/16$$

If all of the weights are equal to one, as in a preferred embodiment, then:

$$C_i = N * \left( S + f_{imin} - \sum_j f_{jmin} \right) / 16$$

$$D_i = (S - f_{imin}) * 4$$

where:
- N=the number of flows to which the bandwidth is to be allocated
- $W_i$=weight for the $i^{th}$ pipe, which is preferably in the range [0,1]
- W=sum of all N weights
- $f_{imin}$=minimum flow for the $i^{th}$ pipe In addition, the flow units are again chosen so that Dt is one and $Q_{max}$ is one.

The flows for the pipes and the queue level of the queue 16 are determined, via step 154. If an epoch has just completed, then the flows and queue level for the previous epoch are determined. The flows are determined over the entire epoch, while the queue level is preferably the queue level at the end of the epoch. In a preferred embodiment, the queue level is the level of the entire memory resource of which the queue 16 is a part. However, in another embodiment, the queue level can be for a logical queue or subqueue. In a preferred embodiment, the instantaneous excess bandwidth signal, B, and the excess bandwidth signal, E are made available if not already determined for a previous epoch. Thus, the information required for the ensuing calculations is available.

It is determined whether excess bandwidth exists for the queue 16, via step 156. In a preferred embodiment, step 156 includes determining whether the queue level is zero or decreasing. However, nothing prevents the use of another criteria for determining whether excess bandwidth exists. If the queue level is decreasing or zero, then it is determined in step 156 that excess bandwidth exists. Otherwise, it is determined that excess bandwidth does not exist. If excess bandwidth exists, then an instantaneous excess bandwidth signal is set to one, via step 158. If not, then the instantaneous excess bandwidth signal is set to zero, via step 160.

The bandwidth signal is then set to be an exponentially weighted average of the instantaneous bandwidth signal, via step 162. In a preferred embodiment, the exponentially weighted bandwidth signal is set to be:

$$E(t+Dt) = (31/32) * E(t) + B(t+Dt)/32$$

Where:
- E(t+Dt)=Excess bandwidth signal for current epoch
- E(t)=Excess bandwidth signal for previous epoch
- B(t+Dt)=Instantaneous excess bandwidth signal for the current epoch In parallel with the updating of the instantaneous bandwidth signal and the bandwidth signal in steps 156 through 162, the transmission fraction for the current epoch is updated, via step 164. The transmission fraction is set in step 164 such that the minimum flow is provided for each active pipe when possible, such that the flow for each pipe does not exceed the maximum, such that the flow linearly increases and exponentially decreases as long as the queue 16 (or corresponding memory resource) has not exceeded a desired level and, where needed, and such that the transmission fraction is set such that the system described by the queue level and the global transmission fraction are critically damped and can account for a higher oversubscription rate. Critical damping means that the system described by the queue level and global transmission fraction reach equilibrium as rapidly as possible. In a preferred embodiment, the transmission fraction for each pipe is set such that:

| | | |
|---|---|---|
| $T_i(t + Dt)$ | = | A if the sum of the offered rates at time t is greater than or equal to a constant D; |
| | = | min $\{1, T_i(t) + F\}$ if $f_i(t)$ is less than or equal to $f_{imin}$; |
| | = | $G*T_i(t)$ if $f_i(t)$ is greater than $f_{imax}$; and otherwise |
| | = | min $\{T(t),$ if $B(t) = 1$ then $T_i(t) + C_i*E(t)$ else $T_i(t) - D_i*f_i(t)$ if $B(t) = 0\}$ |

Where:
- A=a constant less than one and preferably 0.125
- D=a constant less than one and preferably 0.25
- F=a constant less than one and preferably 0.125
- G=a constant less than one and preferably 0.875
- T(t)=a global transmission fraction Preferably, the global transmission fraction is given by:

$$T(t) = \text{minimum}\{1, \text{maximum}(1/8, T(t-Dt)+(2*I(t-Dt)*M(t-Dt)*Dt/Q_{max})*(9/4-2*T(t)-2*M(t)*Q(t)/Q_{max}))\}$$

where:

| | | |
|---|---|---|
| M(t − Dt) | = | the multiplier from the previous epoch |
| | = | the multiplier approaches one in a preferred embodiment when it is repeatedly determined that the queue level exceeds a threshold and ½ when it is repeated determined that the queue level does not exceed the threshold |
| Dt | = | the length of the epoch in appropriate time units |

Thus, the global transmission fraction ensures that the queue level and global transmission fraction are critically damped and that oversubscription can be accounted for.

Based on the transmission fraction determined in step 164, packets, or pieces of traffic, for the pipes are transmitted or dropped, via step 166. In a preferred embodiment, step 166 accounts for the priority of a packet when determining whether to drop a particular packet. In another embodiment, individual packets are randomly dropped to maintain the calculated transmission fractions.

It is then determined whether the epoch has completed, via step 168. If not, then the packets continue to be dropped or transmitted, via step 166. If the epoch has completed, then step 152 is returned to in order to update the values for the next epoch.

The method 150 results in much the same benefits as the methods 100 and 110 thus, differentiated services can be provided in a stable manner and excess bandwidth can be allocated fairly. This is accomplished with minimal effort by the user, merely setting the minimum and maximum flows for the pipes. The method 150 can also be used in a variety of applications, such as in networks using DiffServ, by internet service providers desiring to provide different levels of service for different customers, classes, behavior aggregate flows or different media. This is accomplished merely by allowing the minimum and maximum flow to be set for the behavior aggregate flows, the customers, the media, or other flows corresponding to the pipes in the method 150. Thus, the flow through the pipe, a DiffServ criterion of service, can be regulated as desired.

Furthermore, the method 150 takes advantage of the additional benefits of two of the above-mentioned co-pending patent applications. Because the global transmission fraction can be used, the method 150 can account for higher congestion in an efficient manner. Use of the multiplier, which corresponds to a virtual maximum queue level that decreases as the queue 16 is repeatedly above a threshold, ensures that the switch can remain stable over a wide range of subscriptions. In one embodiment, an over-subscription of up to eight hundred percent may be accounted for. Furthermore, since the global transmission fraction is, in a sense, critically damped, the system described by the queue level and global transmission fraction will rapidly reach a stable state. Consequently, the method 150 allows the desired transmission rates for equilibrium to be rapidly achieved.

It is envisioned that in general, the switch 10 or 10' will use the portion of the method 150 that corresponds to the method 100 and 110. Thus, the pipes will generally be regulated such that a stable limit cycle is achieved. In a preferred embodiment, the flow through a pipe will increase until the queue level is no longer decreasing and will decrease until the queue level is zero or decreasing. It is believed that this will be the normal mode of operation. However, in critical cases, for example because several pipes suddenly become active and desire their minimum flows or the queue level exceed a threshold, another methodology may become active. For example, the global transmission fraction can be utilized to try to ensure that the queue 16 does not become full. When the critical, and typically transitory, state has been accounted for, the transmission fractions which result in the stable limit cycle will again be used. Thus, a switch using the method 150 may operate effectively over a wider range of subscriptions.

A method and system has been disclosed for controlling traffic through a network. Software written according to the present invention is to be stored in some form of computer-readable medium, such as memory, CD-ROM or transmitted over a network, and executed by a processor. Alternatively, some of all of the present invention could be implemented in hardware. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for controlling a plurality of pipes in a computer network including at least one processor for a switch, the at least one processor having a queue, the plurality of pipes utilizing the queue for transmitting traffic through the switch, the method comprising the steps of:

(a) allowing a minimum flow and a maximum flow to be set for each of the plurality of pipes;

(b) determining if excess bandwidth exists for the queue;

(c) linearly increasing a flow for a pipe of the plurality of pipes based on the minimum flow or the maximum flow if excess bandwidth exists and if the flow for the pipe of the plurality of pipes is less than the maximum flow for the pipe and exponentially decreasing the flow for the pipe of the plurality of pipes based on the minimum flow or the maximum flow if excess bandwidth does not exist and the flow is greater than the minimum flow for the pipe, such that the traffic through the queue is stable;

wherein the flow for the pipe of the plurality of pipes is an offered rate multiplied by a transmission fraction and wherein increasing or decreasing step (c) further includes the steps of:

(c1) setting the transmission fraction for the flow to be previous transmission fraction plus a first quantity if excess bandwidth exists and the flow is less than the maximum flow; and (c2) setting the transmission fraction to he the previous transmission fraction minus a second quantity if excess bandwidth does not exist and the flow is greater than the minimum flow, the second quantity being a previous flow multiplied by a constant.

2. The method of claim 1 wherein the plurality of pipes is a plurality of behavior aggregate flows.

3. The method of claim 1 wherein the increasing or decreasing step (c) is performed for each of the plurality of pipes.

4. The method of claim 1 wherein the excess bandwidth determining step (b) further includes the steps of:

(b1) determining the queue level for the queue;

(b2) determining whether the queue level has increased or decreased; and (b3) determining that the excess bandwidth exists if the queue level has decreased or is zero and determining that excess bandwidth does not exist otherwise.

5. The method of claim 4 wherein the excess bandwidth determining step (b3) further includes the step of:

(b3i) setting an instantaneous excess bandwidth signal to be one if the queue level has decreased or is zero and setting the instantaneous excess bandwidth signal to be zero otherwise.

6. The method of claim 5 wherein the excess bandwidth determining step (b3) further includes the step of:

(b3ii) setting an excess bandwidth signal to be an exponentially weighted average of the instantaneous excess bandwidth signal.

7. A method for controlling a plurality of pipes in a computer network including at least one processor for a switch, the at least one processor having a queue, the plurality of pipes utilizing the queue for transmitting traffic through the switch, the plurality of pipes being a plurality of behavior aggregate flows the method comprising the steps of:

(a) allowing a minimum flow and a maximum flow to be set for each of the plurality of pipes:

(b) determining if excess bandwidth exists for the queue, wherein the excess bandwidth determining step (b) further includes the steps of (b1) determining the queue level for the queue;

(b2) determining whether the queue level has increased or decreased; and (b3) determining that the excess bandwidth exists if the queue level has decreased or is zero and determining that excess bandwidth does not exist otherwise, wherein the excess bandwidth determining step (b3) further includes the steps of:

(b3i) setting an instantaneous excess bandwidth signal to be one if the queue level has decreased or is zero and setting the instantaneous excess bandwidth signal to be zero otherwise; and (b3ii) setting an excess bandwidth signal to be an exponentially weighted average of the instantaneous excess bandwidth signal;

(c) linearly increasing a flow for a pipe of the plurality of pipes based on the minimum flow or the maximum flow if excess bandwidth exists and if the flow for the pipe of the plurality of pipes is less than the maximum flow for the pipe or exponentially decreasing the flow for the pipe of the plurality of pipes based on the minimum flow or the maximum flow if excess bandwidth does not exist and the flow is greater than the minimum flow for the pipe, such that the traffic through the queue is stable, wherein the flow for the pipe of the plurality of pipes is an offered rate multiplied by a transmission fraction and wherein increasing or decreasing step (c) further includes the steps of:
  (c1) setting a transmission fraction for the flow to be a previous transmission fraction plus a first quantity if excess bandwidth exists, the first quantity being a first constant multiplied by the excess bandwidth signal; and
  (c2) setting the transmission fraction to be the previous transmission fraction minus a second quantity if excess bandwidth does not exist, the second quantity being the previous flow multiplied by a second constant;

wherein the increasing or decreasing step (c) is performed for each of the plurality of pipes.

8. The method of claim 7 wherein the first constant and the second constant depend upon the minimum flow for the pipe.

9. The method of claim 8 wherein the first constant is 0.125 and the second constant is 0.875.

10. The method of claim 8 wherein the first constant is a weight multiplied a third quantity, the third quantity being a queue service rate plus the minimum flow for the pipe minus the sum of the minimum flow for each of the plurality of pipes.

11. A method for controlling a plurality of pipes in a computer network including at least one processor for a switch, the at least one processor having a queue, the plurality of pipes utilizing the queue for transmitting traffic through the switch, the method comprising the steps of:

(a) allowing a minimum flow and a maximum flow to be set for each of the plurality of pipes;

(b) determining if excess bandwidth exits for the queue;

(c) linearly increasing a flow for a pipe of the plurality of pipes based on the minimum flow or the maximum flow if excess bandwidth exists and if the flow for the pipe of the plurality of pipes is less than the maximum flow for the pipe or exponentially decreasing the flow for the pipe of the plurality of pipes based on the minimum flow or the maximum flow if excess bandwidth does not exist and the flow is greater than the minimum flow for the pipe, such that the traffic through the queue is stable, wherein the flow is a transmission fraction multiplied by an offered rate and wherein the increasing or decreasing step (c) further includes the steps of:
  (c1) setting the transmission fraction for the flow to a first constant if a sum of a plurality of flows from the plurality of pipes is greater than a first queue level;
  (c2) setting the transmission fraction for the pipe to be the minimum of one and a previous transmission fraction for the pipe plus the first constant if the flow for the pipe is less than or equal to the minimum flow for the pipe;
  (c3) setting the transmission fraction to be the previous transmission fraction for the pipe multiplied by a second constant if the flow for the pipe is greater than the maximum flow for the pipe, the second constant being less than one; and
  (c4) otherwise setting the transmission fraction for the pipe to be the minimum of a global transmission fraction and a first quantity, the first quantity being the previous transmission fraction plus a second quantity if excess bandwidth exists, the first quantity being the previous transmission fraction minus a third quantity if excess bandwidth does not exist, the second quantity being a third constant multiplied by a signal, the third constant depending on the minimum flow, the signal approaching one for repeated instances of excess bandwidth and approaching zero for repeated instances of no excess bandwidth, the third quantity being a fourth constant depending on the minimum flow multiplied by the previous flow, the global transmission fraction allowing critical damping between the global transmission fraction and the queue level.

12. The method of claim 11 wherein the global transmission fraction is the minimum of one and a first value, the first value being a maximum of a fifth constant and a second value, the second value being a previous global transmission fraction plus a third value, the third value being a fourth value multiplied by a fifth value, the fourth value being a sixth constant multiplied by a previous multiplier multiplied by a global offered rate multiplied by a time interval divided by a maximum queue level, the fifth value being a seventh constant minus an eighth constant multiplied by the previous multiplier multiplied by the queue level divided by the maximum queue level, the multiplier being an exponentially weighted average which approaches a first level if a previous queue level is below a threshold and which approaches a second level if the previous queue level is above the threshold.

13. The method of claim 1 wherein the queue further includes a hardware memory resource.

14. A computer-readable medium containing a program for controlling a plurality of pipes in a computer network including at least one processor for a switch, the at least one processor having a queue, the plurality of pipes utilizing the queue for transmitting traffic through the switch, the program including instruction for:

(a) allowing a minimum flow and a maximum flow to be set for each of the plurality of pipes;

(b) determining if excess bandwidth exists for the queue;

(c) linearly increasing a flow for a pipe of the plurality of pipes based on the minimum flow or the maximum flow if excess bandwidth exists and if the flow for the pipe of the plurality of pipes is less than the maximum flow for the pipe and exponentially decreasing the flow for the pipe of the plurality of pipes based on the minimum flow or the maximum flow if excess bandwidth does not exist and the flow is greater than the minimum flow for the pipe, such that the traffic through the queue is stable;

wherein the flow for the pipe of the plurality of pipes is an offered rate multiplied by a transmission fraction and wherein increasing or decreasing step (c) further includes the steps of:
  (c1) setting the transmission fraction for the flow to be a previous transmission fraction plus a first quantity if excess bandwidth exists and the flow is less than the maximum flow; and
  (c2) setting the transmission fraction to be the previous transmission fraction minus a second quantity if excess bandwidth does not exist and the flow is greater than the minimum flow, the second quantity being a previous flow multiplied by a constant.

15. The computer-readable medium of claim 14 wherein the excess bandwidth determining instructions (b) further includes instruction for:

(b1) determining the queue level for the queue;

(b2) determining whether the queue level has increased or decreased; and (b3) determining that the excess bandwidth exists if the queue level has decreased or is zero and determining that excess bandwidth does not exist otherwise.

16. A computer-readable medium containing a program for controlling a plurality of pipes in a computer network including at least one processor for a switch, the at least one processor having a queue, the plurality of pipes utilizing the queue, for transmitting traffic through the switch, the program including instruction for:

(a) allowing a minimum flow and a maximum flow to be set for each of the plurality of pipes;

(b) determining if excess bandwidth exists for the queue;

(c) linearly increasing a flow for a pipe of the plurality of pipes based on the minimum flow or the maximum flow if excess bandwidth exists and if the flow for the pipe of the plurality of pipes is less than the maximum flow for the pipe or exponentially decreasing the flow for the pipe of the plurality of pipes based on the minimum flow or the maximum flow if excess bandwidth does not exist and the flow is greater than the minimum flow for the pipe, such that the traffic through the queue is stable, wherein the flow is an offered rate multiplied by a transmission fraction, the increasing or decreasing instructions (c) further includes instructions for:

(c1) setting the transmission fraction to a first constant if a sum of a plurality of flows from the plurality of pipes is greater than a first queue level;

(c2) setting the transmission fraction for the pipe to be the minimum of one and a previous transmission fraction for the pipe plus the first constant if the flow for the pipe is less than or equal to the minimum flow for the pipe;

(c3) setting the transmission fraction to be the previous transmission fraction for the pipe multiplied by a second constant if the flow for the pipe is greater than the maximum flow for the pipe, the second constant being less than one; and (c4) otherwise setting the transmission fraction for the pipe to be the minimum of a global transmission fraction and a first quantity, the first quantity being the previous transmission fraction plus a second quantity if excess bandwidth exists, the first quantity being the previous transmission fraction minus a third quantity if excess bandwidth does not exist, the second quantity being a third constant multiplied by a signal, the third constant depending on the minimum flow, the signal approaching one for repeated instances of excess bandwidth and approaching zero for repeated instances of no excess bandwidth, the third quantity being a fourth constant depending on the minimum flow multiplied by the previous transmission fraction, the global transmission fraction allowing critical damping between the global transmission fraction and the queue level.

17. The computer-readable medium of claim 16 wherein the global transmission fraction is the minimum of one and a first value, the first value being a maximum of a fifth constant and a second value, the second value being a previous global transmission fraction plus a third value, the third value being a fourth value multiplied by a fifth value, the fourth value being a sixth constant multiplied by a previous multiplier multiplied by a global offered rate multiplied by a time interval divided by a maximum queue level, the fifth value being a seventh constant minus an eighth constant multiplied by the previous multiplier multiplied by the queue level divided by the maximum queue level, the multiplier being an exponentially weighted average which approaches a first level if a previous queue level is below a threshold and which approaches a second level if the previous queue level is above the threshold.

18. A system for controlling a plurality of pipes in a computer network including a switch crossed by the plurality of pipes, the system comprising:

a queue for use by the plurality of pipes in transmitting traffic through the switch; an enqueuing mechanism, coupled with the queue, for controlling traffic through the switch using a minimum flow and a maximum flow set for each of the plurality of pipes by a user, the flow control mechanism for determining if excess bandwidth exists for the queue and for linearly increasing a flow for a pipe of the plurality of pipes based on the minimum flow or the maximum flow if excess bandwidth exists and if the flow for the pipe of the plurality of pipes is less than the maximum flow for the pipe and exponentially decreasing the flow for the pipe of the plurality of pipes based on the minimum flow or the maximum flow if excess bandwidth does not exist and the flow is greater than the minimum flow for the pipe, such that the traffic through the queue is stable;

wherein the flow for the pipe of the plurality of pipes is an offered rate multiplied by a transmission fraction and wherein enqueuing mechanism sets the transmission fraction for the flow to be a previous transmission fraction plus a first quantity if excess bandwidth exists and the flow is less than the maximum flow and setting the transmission fraction to be the previous transmission fraction minus a second quantity if excess bandwidth does not exist and the flow is greater than the minimum flow, the second quantity being a previous flow multiplied by a constant.

19. The system of claim 18 wherein the plurality of pipes are a plurality of behavior aggregate flows.

20. The system of claim 18 wherein the enqueuing mechanism increases or decreases the flow for each of the plurality of pipes based on whether or not excess bandwidth exists.

21. The system of claim 18 wherein enqueuing mechanism determines whether excess bandwidth exists by determining the queue level for the queue, determining whether the queue level has increased or decreased, indicating that the excess bandwidth exists if the queue level has decreased or is zero and indicating that excess bandwidth does not exist otherwise.

22. The system of claim 21 wherein enqueuing mechanism further indicates that excess bandwidth exists by setting an instantaneous excess bandwidth signal to be one if the queue level has decreased or is zero and setting the instantaneous excess bandwidth signal to be zero otherwise.

23. The system of claim 22 wherein the enqueuing mechanism further indicates that excess bandwidth exists by setting an excess bandwidth signal to be an exponentially weighted average of the instantaneous excess bandwidth signal.

24. A system for controlling a plurality of pipes in a computer network including a switch crossed by the plurality of pipes, the system comprising:

a queue for use by the plurality of pipes in transmitting traffic through the switch an enqueuing mechanism, coupled with the queue, for controlling traffic through the switch using a minimum flow and a maximum flow set for each of the plurality of pipes by a user, the flow control mechanism for determining if excess bandwidth exists for the queue and for linearly increasing a flow for a pipe of the plurality of pipes based on the minimum flow or the maximum flow if excess bandwidth exists and if the flow for the pipe of the plurality of pipes is less than the maximum flow for the pipe or exponentially decreasing the flow for the pipe of the plurality of pipes based on the minimum flow or the maximum flow if excess bandwidth does not exist and the flow is greater than the minimum flow for the pipe, such that the traffic through the queue is stable;

wherein enqueuing mechanism determines whether excess bandwidth exists by determining the queue level for the queues, determining whether the queue level has increased or decreased, indicating that the excess bandwidth exists if the queue level has decreased or is zero and indicating that excess bandwidth does not exist otherwise;

wherein enqueuing mechanism further indicates that excess bandwidth exists by setting an instantaneous excess bandwidth signal to be one if the queue level has decreased or is zero and setting the instantaneous excess bandwidth signal to be zero otherwise;

wherein the enqueuing mechanism further indicates that excess bandwidth exists by setting an excess bandwidth signal to be an exponentially weighted average of the instantaneous excess bandwidth signal;

wherein the flow of the pipe is an offered rate multiplied by a transmission fraction and wherein the enqueuing mechanism further increases or decreases the flow by setting the transmission fraction to be a previous transmission fraction plus a first quantity if excess bandwidth exists, the first quantity being a first constant multiplied by the excess bandwidth signal and setting the transmission fraction to be the previous transmission fraction minus a second quantity if excess bandwidth does not exist, the second quantity being the previous transmission fraction multiplied by a second constant.

25. The system of claim 24 wherein the first constant and the second constant depend upon the minimum flow for the pipe.

26. The system of claim 25 wherein the first constant is 0.125 and the second constant is 0.875.

27. The system of claim 25 wherein the first constant is a weight multiplied a third quantity, the third quantity being a queue service rate plus the minimum flow for the pipe minus the sum of the minimum flow for each of the plurality of pipes.

28. A system for controlling a plurality of pipes in a computer network including a switch crossed by the plurality of pipes, the system comprising:

a queue for use by the plurality of pipes in transmitting traffic through the switch; an enqueuing mechanism, coupled with the queue, for controlling traffic through the switch using a minimum flow and a maximum flow set for each of the plurality of pipes by a user, the flow control mechanism for determining if excess bandwidth exists for the queue and for linearly increasing a flow for a pipe of the plurality of pipes based on the minimum flow or the maximum flow if excess bandwidth exists and if the flow for the pipe of the plurality of pipes is less than the maximum flow for the pipe or exponentially decreasing the flow for the pipe of the plurality of pipes based on the minimum flow or the maximum flow if excess bandwidth does not exist and the flow is greater than the minimum flow for the pipe, such that the traffic through the queue is stable;

wherein the enqueuing mechanism further increases or decreases the flow by setting the transmission fraction to a first constant if a sum of a plurality of flows from the plurality of pipes is greater than a first queue level, by setting the transmission fraction for the pipe to be the minimum of one and a previous transmission fraction for the pipe plus the first constant if the flow for the pipe is less than or equal to the minimum flow for the pipe, by setting the transmission fraction to be the previous transmission fraction for the pipe multiplied by a second constant if the flow for the pipe is greater than the maximum flow for the pipe, the second constant being less than one, and by setting the transmission fraction for the pipe to be the minimum of a global transmission fraction and a first quantity otherwise, the first quantity being the previous transmission fraction plus a second quantity if excess bandwidth exists, the first quantity being the previous transmission fraction minus a third quantity if excess bandwidth does not exist, the second quantity being a third constant multiplied by a signal, the third constant depending on the minimum flow, the signal approaching one for repeated instances of excess bandwidth and approaching zero for repeated instances of no excess bandwidth, the third quantity being a fourth constant depending on the minimum flow multiplied by the previous transmission fraction, the global transmission fraction allowing critical damping between the global transmission fraction and the queue level.

29. The system of claim 28 wherein the global transmission fraction is the minimum of one and a first value, the first value being a maximum of a fifth constant and a second value, the second value being a previous global transmission fraction plus a third value, the third value being a fourth value multiplied by a fifth value, the fourth value being a sixth constant multiplied by a previous multiplier multiplied by a global offered rate multiplied by a time interval divided by a maximum queue level, the fifth value being a seventh constant minus an eighth constant multiplied by the previous multiplier multiplied by the queue level divided by the maximum queue level, the multiplier being an exponentially weighted average which approaches a first level if a previous queue level is below a threshold and which approaches a second level if the previous queue level is above the threshold.

30. The system of claim 18 wherein the queue further includes a hardware memory resource.

31. The system of claim 18 wherein the switch includes a plurality of processors corresponding to a plurality of blades, each of the plurality of processors having a plurality of ports and wherein the queue is for a processor of the plurality of processors.

32. A processor for use with a switch in a computer network, the processor being coupled to a plurality of ports and a switch fabric, the processor comprising:

a queue accepting traffic from a plurality of pipes in a computer network; and an enqueuing mechanism, coupled with the queue, for controlling a flow from a pipe of the plurality of pipes, the enqueuing mechanism determining if excess bandwidth exists for the queue and linearly increasing a flow for a pipe of the plurality of pipes based on a minimum flow or a maximum flow if excess bandwidth exists and if the flow for the pipe of the plurality of pipes is less than the maximum flow for the pipe and exponentially decreasing the flow for the pipe of the plurality of pipes based on the minimum flow or the maximum flow if excess bandwidth does not exist and the flow is greater than the minimum flow for the pipe, such that the traffic through the queue is stable, the minimum flow and the maximum flow being set by a user;

wherein the flow for the pipe of the plurality of pipes is an offered rate multiplied by a transmission fraction and wherein the enqueuing mechanism further sets the transmission fraction for the flow to be a previous transmission fraction plus a first quantity if excess bandwidth exists and the flow is less than the maximum flow and sets the transmission fraction to be the previous transmission fraction minus a second quantity if excess bandwidth does not exist and the flow is greater than the minimum flow, the second quantity being a previous flow multiplied by a constant.

33. A switch for use in a computer network including a plurality of hosts, the switch comprising:

a plurality of processors, each of the plurality of processors coupled with a plurality of ports, the plurality of ports coupled with a portion of the plurality of hosts, each of the plurality of processors including a queue and an enqueuing mechanism, the queue accepting traffic from a plurality of pipes in a computer network, the plurality of pipes coupling a portion of the plurality of ports coupled with a first processor and a portion of the plurality of ports coupled with a second processor, the enqueuing mechanism being coupled with the queue and the setting means, the enqueuing mechanism for controlling a flow from a pipe of the plurality of pipes, the enqueuing mechanism determining if excess bandwidth exists for the queue and linearly increasing a flow for a pipe of the plurality of pipes based on a minimum flow or a maximum flow for the pipe if excess bandwidth exists and if the flow for the pipe of the plurality of pipes is less than the maximum flow for the pipe and exponentially decreasing the flow for the pipe of the plurality of pipes based on the minimum flow or the maximum flow if excess bandwidth does not exist and the flow is greater than the minimum flow for the pipe, such that the traffic through the queue is stable, the minimum flow and the maximum flow for the pipe of the plurality of pipes being set by a user; and switch fabric coupling the plurality of processors;

wherein the flow for the pipe of the plurality of pipes is an offered rate multiplied by a transmission fraction and wherein the enqueuing mechanism further sets the transmission fraction for the flow to be a previous transmission fraction plus a first quantity if excess bandwidth exists and the flow is less than the maximum flow and sets the transmission fraction to be the previous transmission fraction minus a second quantity if excess bandwidth does not exist and the flow is greater than the minimum flow, the second quantity being a previous flow multiplied by a constant.

34. The switch of claim 33 wherein each of the plurality of processors corresponds to a blade of a plurality of blades.

35. A method or managing flow in a network comprising:

establishing a minimum flow and a maximum flow for pipes providing traffic to at least one Queue;

determining if excess bandwidth exists in the Queue; and linearly increasing a flow for a pipe of the plurality of pipes based on the minimum flow or maximum flow if excess bandwidth exists and if the flow for the pipe is less than the maximum flow for the pipe and exponentially decreasing the flow for the pipe if excess bandwidth does not exist and the flow in the pipes is greater than the minimum flow for the pipe;

wherein the flow for the pipe of the plurality of pipes is an offered rate multiplied by a transmission fraction and wherein the linearly increasing step further includes the steps of setting the transmission fraction for the flow to be a previous transmission fraction plus a first quantity if excess bandwidth exists and the flow is less than the maximum flow; and setting the transmission fraction to be the previous transmission fraction minus a second quantity if excess bandwidth does not exist and the flow is greater than the minimum flow, the second quantity being previous flow multiplied by a constant.

36. A program product comprising:

a computer readable medium; and a computer program recorded on said medium, said computer program including instruction code that establishes a minimum flow and a maximum flow for pipes providing traffic to at least one Queue;

instruction code that determines if excess bandwidth exists in the Queue; and instruction code that linearly increases flow for a pipe of the plurality of pipes based on the minimum flow or maximum flow if excess bandwidth exists and if the flow for the pipe is less than the maximum flow for the pipe and exponentially decreases the flow for the pipe if excess bandwidth does not exist and the flow in the pipes is greater than the minimum flow for the pipe;

wherein the flow for the pipe of the plurality of pipes is an offered rate multiplied by a transmission fraction and wherein the instruction code further sets the transmission fraction for the flow to be a previous transmission fraction plus a first quantity if excess bandwidth exists and the flow is less than the maximum flow and sets the transmission fraction to be the previous transmission fraction minus a second quantity if excess bandwidth does not exist and the flow is greater than the minimum flow, the second quantity being a previous flow multiplied by a constant.

37. A computer network comprising:

at least one Node including at least one Queue;

a plurality of pipes providing flows to the at least one Queue;

a mechanism that sets a minimum flow and a maximum flow for each pipe of the plurality of pipes; and a flow control mechanism that measures bandwidth capacity in said Queue and adjusts allocation in the pipes based upon maximum or minimum flow setting in each pipe and the bandwidth capacity in the Queue;

wherein the flow for the pipe of the plurality of pipes is an offered rate multiplied by a transmission fraction and wherein the flow control mechanism further sets the transmission fraction for the flow to be a previous transmission fraction plus a first quantity if excess bandwidth exists and the flow is less than the maximum flow and sets the transmission fraction to be the previous transmission fraction minus a second quantity if excess bandwidth does not exist and the flow is greater than the minimum flow, the second quantity being a previous flow multiplied by constant.

38. The computer network of claim 37 wherein the at least one node includes a switch.

39. The method of claim 1 wherein the first quantity is a second constant multiplied by an exponentially weighted average of an instantaneous excess bandwidth signal.

40. The computer-readable medium of claim 14 wherein the first quantity is a second constant multiplied by an exponentially weighted average of an instantaneous excess bandwidth signal.

41. The system of claim 18 wherein the first quantity is a second constant multiplied by an exponentially weighted average of an instantaneous excess bandwidth signal.

42. The processor of claim 32 wherein the first quantity is a second constant multiplied by an exponentially weighted average of an instantaneous excess bandwidth signal.

43. The switch of claim 33 wherein the first quantity is a second constant multiplied by an exponentially weighted average of an instantaneous excess bandwidth signal.

44. The method of claim 35 wherein the first quantity is a second constant multiplied by an exponentially weighted average of an instantaneous excess bandwidth signal.

45. The program product of claim 36 wherein the first quantity is a second constant multiplied by an exponentially weighted average of an instantaneous excess bandwidth signal.

46. The computer network of claim 37 wherein the first quantity is a second constant multiplied by an exponentially weighted average of an instantaneous excess bandwidth signal.

* * * * *

UNITED STATES PATENT AND TRADEMARK OFFICE
CERTIFICATE OF CORRECTION

PATENT NO. : 6,657,960 B1 Page 1 of 1
APPLICATION NO. : 09/448197
DATED : December 2, 2003
INVENTOR(S) : Jeffries et al.

It is certified that error appears in the above-identified patent and that said Letters Patent is hereby corrected as shown below:

column 14, line 1, after "be" add -- a --.
column 14, line 5, delete "he" and replace with -- be --.
column 15, line 37, delete "exits" and replace with -- exists--.
column 19, line 15, delete "queues" and replace with -- queue--.
column 22, line 67, add -- a -- after "by".

Signed and Sealed this

Eighth Day of August, 2006

JON W. DUDAS
*Director of the United States Patent and Trademark Office*